Patented May 19, 1925.

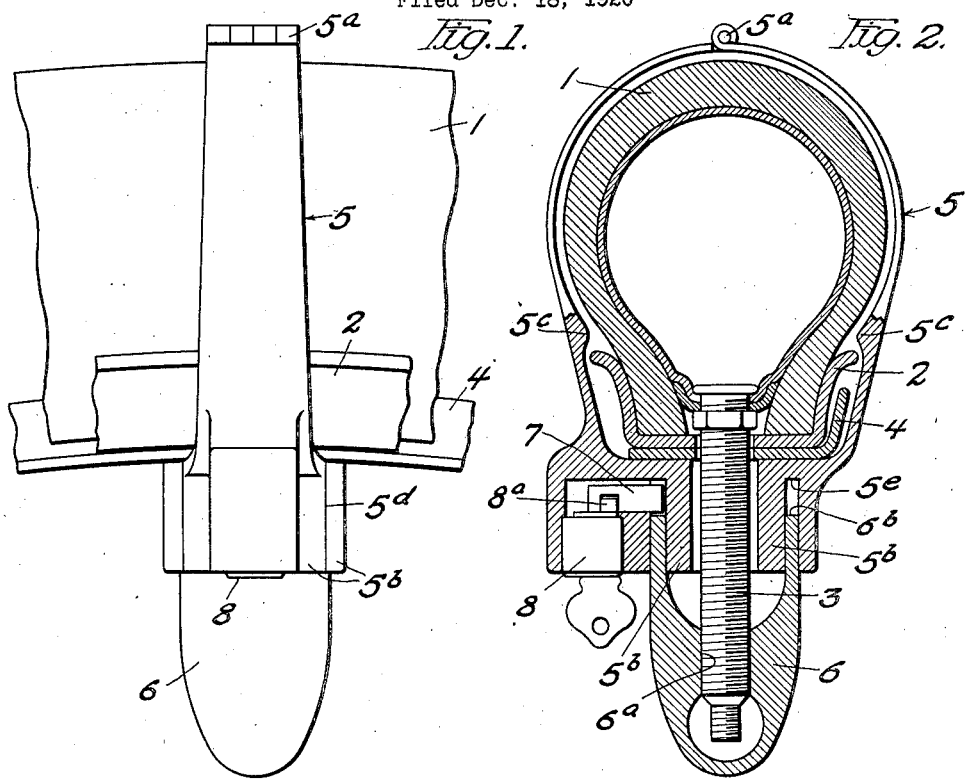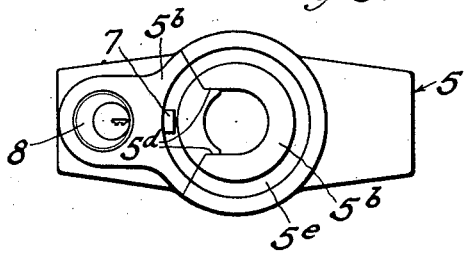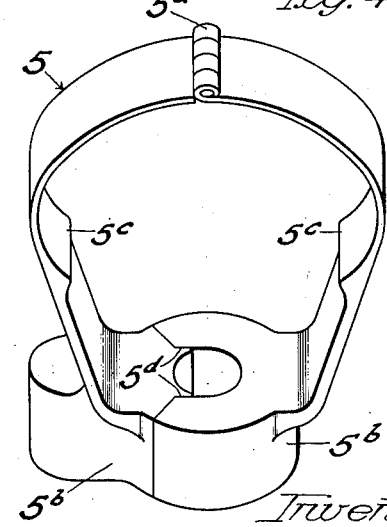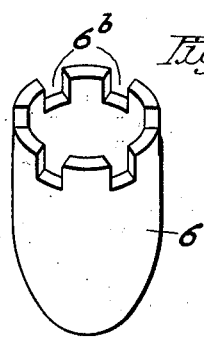

1,538,843

UNITED STATES PATENT OFFICE.

THEODORE D. STANLEY, OF DETROIT, MICHIGAN, ASSIGNOR TO LELAND LOCK COMPANY, OF DETROIT, MICHIGAN, A CORPORATION OF MICHIGAN.

TIRE LOCK.

Application filed December 18, 1920. Serial No. 431,684.

*To all whom it may concern:*

Be it known that I, THEODORE D. STANLEY, a citizen of the United States, and a resident of Detroit, Michigan, have invented an Improvement in Tire Locks, of which the following is a specification.

This invention relates to devices for preventing unauthorized removal and theft of tires from automobiles and other vehicles, or from display racks and the like.

Among other objects, the invention is intended to provide practical and reliable means for locking a pneumatic tire to or in place upon a tire holder.

One illustrative device, containing an embodiment of the invention, is shown for example in the accompanying drawings, in which Fig. 1 is a front elevation of the illustrative device, with a segment of a tire and tire holder.

Fig. 2 is a vertical cross-section of the same.

Fig. 3 is a bottom view of the lock housing member of the illustrative device, which in this instance is a tire encircling bracelet.

Fig. 4 is a perspective view of said member or bracelet.

Fig. 5 is a perspective view of the valve stem cap.

The drawings show an inflated automobile tire 1, fitted to a demountable wheel rim 2 which in this instance may be considered as a fixed element of the tire. The inner air tube of the tire is provided with the usual valve stem 3, protruding through an opening in the demountable wheel rim, and which may also be considered as a fixed element of the tire.

The assembled wheel rim and tire, representing in this case an extra or spare tire, is shown mounted on the carrier rim 4 of a spare tire carrier or rack such as is usually carried at the rear of the automobile. As indicated in the drawings, the tire is applied to the carrier rim with the valve stem passed through an opening in the carrier rim. Only a small segment of the tire and carrier rim is shown. Said carrier rim 4 typifies any holder either for supporting or carrying the tire, inclusive of a wheel or felly on which the tire is mounted.

While the illustrative holder 4 exemplifies a support for engaging the tire internally, and on which in this instance the tire is mounted analogously to its mounting on a wheel felly, it will be understood that devices embodying features of the present invention may be used for attaching and locking tires to other forms of tire holders.

The illustrative device for locking the tire to the illustrative tire holder comprises a tire encircling strap or bracelet 5, the separable end portions of which are brought together under the tire holder and united by a cap 6 screwed upon and covering the valve stem; said cap being locked in place by locking means which in this instance is mounted in the bracelet, the latter or the part thereof containing the lock typifying a lock housing member for cooperation with the other member of the device.

In the specific form illustrated, the bracelet or member 5 is composed of two metal strap sections hinged together at 5ª and having enlarged end portions 5ᵇ and formed with humps or projections 5ᶜ to conform to the general configuration of the tire and tire holder. Said end portions 5ᵇ are shaped to close around or provide an opening or passage for the valve stem and to fit together with a dove-tailed joint, as indicated at 5ᵈ, and are provided with complemental portions of an annular groove 5ᵉ to receive the open end or rim of the metal cap 6, the latter being castellated or notched as indicated at 6ᵇ for engagement by the lock bolt 7 actuated by lock 8 set in one of the end portions 5ᵇ. The cap has the internal female screw 6ª by which it is screwed upon the valve stem, thereby if desired clamping the parts 5ᵇ to the under side of the tire holder and clamping the tire rigidly in place through the valve stem and cooperating parts mentioned.

Thus the parts 5ᵇ compose a holder-engaging means or member clamped to or held applied to the tire holder through valve-stem engaging means, and specifically by a valve stem screw cap; said parts being provided with extentions formed with the humps 5ᶜ, which extensions by cooperation with the carrier rim and tire or rim 2 thereof prevent any substantial turning movement or rotation either of the holder-engaging member or of the tire on the axis of the valve stem, thwarting effort by unauthorized persons to disengage the valve stem from the screw cap 6. Such extensions being continued over or around the tire form tire clasping means, the parts 5ᵇ thus typifying separable tire clasping elements; and the connection of these extensions by the hinged joint 5ᵃ enables the holder-engaging means 5ᵇ to be conveniently applied and held before applying the cap.

Aside however from the foregoing mode of operation, the illustrative device exemplifies fastening and locking the tire by cooperable tire clasping elements and specifically by a separable tire encircling bracelet or strap fastened by a locked valve stem cap or cover, rendering the valve stem inaccessible as well as rendering the tire non-removable from its holder by the locking of the bracelet itself.

Exemplification by the illustrative device of various combinations and sub-combinations embodying features of the present invention, as hereinafter set forth in the appended claims, will be readily understood from the foregoing.

The lock 8 is preferably of the pin and cylinder type, which as well known comprises a cylinder controlled by pin detents, which cylinder can be released and operated by inserting and turning only the proper key. The lock cylinder is shown having an eccentric stud 8ᵃ engaging a cross-slot of the lock bolt 7 for operating the latter. By a half turn of the locked cylinder from the position shown in Fig. 2, the lock bolt is withdrawn to release and permit disconnection of the cap 6.

With the illustrative construction it is impossible to obtain access to the valve stem and associated parts until the cap is unlocked and unscrewed from the valve stem, and as the lock cannot be picked there is substantially no danger of theft of the tire as is so easily possible where the tire is secured by an ordinary chain and pad lock. As before indicated neither the fitting 5 nor the tire can be rotated to unscrew the cap 6.

Furthermore, the inaccessibility of the tip of the valve stem renders it impossible to deflate the tire by opening the valve; consequently danger of theft of the outer tire case or shoe by deflation of the tire and forcible removal of the outer shoe from the wheel rim is substantially eliminated, since it is impossible to deflate the tire sufficiently for such removal except by substantially damaging the tire by cutting or punching. The closure of the valve stem by the cap is also an effective protection against dust.

While the tire shown in the drawings is fitted to a demountable wheel rim, considered in this instance as an element of the tire, it will be understood that devices embodying the invention may be used for locking pneumatic tires to wheel rims to which they are fitted, for instance to the non-demountable wheel rims of ordinary Ford cars.

An invention which embraces the specific structure herein shown and described is broadly claimed in an earlier application of the present inventor, while the claims of this application are directed to constructions and combinations specifically different from the specific structure disclosed in the aforesaid earlier application.

Obviously the present invention is not limited to any particular form of construction and the details of the illustrative construction may be variously modified. Moreover it is not indispensable that all the features of the invention be used conjointly as they may be used to advantage in various different combinations and sub-combinations.

I claim:

1. A device for locking a pneumatic tire to a tire holder, comprising a holder-engaging member having a passage for the valve stem of the tire and having projections to embrace the tire holder; a screw cap adapted to be screwed upon the valve stem; said member adapted to be held applied to the holder by said screw cap; and means for locking said cap to said member.

2. A device for locking a pneumatic tire to a tire holder, comprising separate interfitting parts adapted for locked connection; one of said parts comprising a screw cap adapted to be screwed upon the valve stem of the tire; another said part adapted to be applied to the tire holder before affixing said cap and to be held so applied by said cap; said last mentioned part constructed to cooperate with the tire holder to prevent rotation of said part; and means for locking said parts.

3. A device for locking a pneumatic tire to a tire holder, comprising separate interfitting parts adapted for locking connection; one of said parts comprising a screw cap adapted to be screwed upon the valve stem of the tire; another said part adapted to be applied to the tire holder before affixing said cap and to be held so applied by said cap, said last mentioned part constructed to cooperate with the tire to prevent rotation of said part or of the tire on the axis of the valve stem; and locking means for said parts.

4. A device of the class described comprising, in combination, a bracelet for encircling a tire and tire holder; said bracelet having separable end portions adapted to close around the valve stem of the tire; a cap for covering the valve stem adapted for interfitting engagement with said bracelet end portions; valve stem engaging means within the cap; and means for locking said cap to said bracelet.

5. A device of the class described comprising, in combination, a bracelet for encircling a tire and tire holder; said bracelet having separable end portions; a screw cap to engage the valve stem; said cap adapted to cooperate with said bracelet end portions to prevent separation thereof; and means for locking said cap to said bracelet.

6. A device of the class described comprising, a separable bracelet for encircling a tire and tire holder; and valve stem engaging and covering means adapted for uniting the end portions of said bracelet; and locking means.

7. A device of the class described comprising, in combination, separable tire-clasping means; a screw-cap to screw on the valve-stem of the tire and cooperable with said means to fasten the same in tire-clasping engagement; and means for locking said cap to said separable tire-clasping means.

8. A device of the class described comprising, in combination, a tire-encircling bracelet having a member applicable to the inner side of a holder for the tire and having a cooperating member separable therefrom; a screw-cap to engage the valve-stem of the tire and cooperable with said members to prevent separation thereof; and means for locking said cap in engagement with said members.

In testimony whereof, I have signed my name to this specification.

THEODORE D. STANLEY.